(12) United States Patent
Schiele (10) Patent No.: US 9,656,284 B2
(45) Date of Patent: May 23, 2017

(54) COATING SYSTEM (71) Applicant: Josef Schiele oHG, Niederzissen (DE)

(72) Inventor: Stefan Schiele, Niederzissen (DE)

(73) Assignee: Josef Schiele oHG, Niederzissen (DE)

( * ) Notice: Subject to any disclaimer, the term of this patent is extended or adjusted under 35 U.S.C. 154(b) by 23 days.

(21) Appl. No.: 14/407,737

(22) PCT Filed: Jun. 12, 2013

(86) PCT No.: PCT/EP2013/062190
§ 371 (c)(1),
(2) Date: Dec. 12, 2014

(87) PCT Pub. No.: WO2013/186281
PCT Pub. Date: Dec. 19, 2013

(65) Prior Publication Data
US 2015/0165468 A1 Jun. 18, 2015

(30) Foreign Application Priority Data

Jun. 15, 2012 (DE) .......... 10 2012 105 243

(51) Int. Cl.
| | | |
|---|---|---|
| B05B 13/02 | (2006.01) | |
| B05C 13/02 | (2006.01) | |
| B05C 1/08 | (2006.01) | |
| B65G 21/20 | (2006.01) | |
| B65G 39/18 | (2006.01) | |
| B05B 15/12 | (2006.01) | |
| E06B 3/30 | (2006.01) | |

(52) U.S. Cl.
CPC ............ B05C 1/08 (2013.01); B05B 13/0221 (2013.01); B05B 13/0228 (2013.01); B65G 21/2054 (2013.01); B65G 39/18 (2013.01); B05B 15/1207 (2013.01); E06B 3/30 (2013.01)

(58) Field of Classification Search
USPC ................ 118/325, 620–640, 58, 66, 67, 68
See application file for complete search history.

(56) References Cited

U.S. PATENT DOCUMENTS

| | | | | |
|---|---|---|---|---|
| 2,801,847 A | * | 8/1957 | Huck ...................... | B65H 20/24 242/364.3 |
| 4,835,004 A | * | 5/1989 | Kawanishi ................ | B05B 5/14 118/624 |

(Continued)

FOREIGN PATENT DOCUMENTS

| | | |
|---|---|---|
| DE | 10062084 A1 | 6/2002 |
| DE | 102008036550 A1 | 2/2010 |
| EP | 0009508 A1 | 4/1980 |

OTHER PUBLICATIONS

International Preliminary Report on Patentability for Application No. PCT/EP2013/062190; dated Aug. 19, 2014.

(Continued)

*Primary Examiner* — Yewebdar Tadesse
(74) *Attorney, Agent, or Firm* — The Dobrusin Law Firm, P.C.

(57) ABSTRACT

The present invention relates to a coating system for coating an elongated wood, plastic and/or metal workplace with a coating agent. Said system comprises a pre-treatment station, a coating station and/or a drying station. A transport means transports the workplace along the coating systems.

11 Claims, 10 Drawing Sheets

(56) References Cited

U.S. PATENT DOCUMENTS

| | | | | |
|---|---|---|---|---|
| 5,379,697 | A | * | 1/1995 | Ertl .................... B41F 23/0483 101/424.1 |
| 6,532,353 | B1 | * | 3/2003 | Orchard ............. G03G 15/2025 399/327 |
| 2006/0216414 | A1 | * | 9/2006 | Sakamoto ............... G02F 1/133 427/162 |
| 2010/0206350 | A1 | * | 8/2010 | Montello .............. B21C 47/345 136/244 |
| 2011/0223745 | A1 | * | 9/2011 | Wieting ................ C23C 14/185 438/478 |
| 2012/0223117 | A1 | * | 9/2012 | Kasiske, Jr. ........... B65H 27/00 226/1 |

OTHER PUBLICATIONS

International Search Report for Application No. PCT/EP2013/062190; dated Jan. 29, 2014.

\* cited by examiner

COATING SYSTEM

The present invention relates to a coating system for coating an elongated wood, plastic and/or metal workpiece with a coating agent. Said system comprises a pre-treatment station, a coating station and/or a drying station. A transport means transports the profile along the coating system.

Such coating systems are known from the prior art and are used, for example, to coat parquet flooring with a varnish or similar. However, there is a demand to be able to coat more complex workpiece profiles, such as door or window frames, in order to provide products having different colours and/or protection from the elements.

The objective of the present invention is therefore to provide a coating system capable of coating diverse and complex door and/or window profiles.

This objective is achieved with a coating system for coating an elongated wood, plastic and/or metal workpiece with a coating agent using a pre-treatment station, a coating station and/or a drying station, wherein a transport means transports the profile along, the coating system, and wherein the transport means has a profiled roller having a generally horizontal axis of rotation, comprising at least one recess and at least one notch edge and/or a support surface, but preferably no fixed rail.

The disclosures made with respect to this aspect of the present invention apply to other aspects of the present invention equally and vice versa.

The present invention relates to a coating system with which an elongated wood, plastic and/or metal workpiece can be coated with a coating agent, for example with a finish, preferably water soluble. The profiled workpiece can be partially or completely coated. This coating system preferably comprises a pre-treatment station in which the workpiece is first freed of residues. Following removal of the residues, the surface can be prepared for coating. Subsequently, coating of the workpiece takes place within a coating station in which the surface of the workpiece is coated.

The coating agent which is applied, for example the finish, is subsequently dried in a drying station.

According to the present invention, this coating system has a means of transport which transports the profiles from the coating system's ingress to its egress. Furthermore according to the present invention, this transport means has at least one and preferably a plurality of profiled rollers, meaning rollers which do not have a constant cross-section. These profiled rollers preferably rotate about a generally horizontal axis of rotation. Each roller preferably has the same profile, which according to the present invention has at least one indentation, at least one indented edge and/or a bearing surface. Thereby the rollers guide the workpiece as it in is transported through the coating system according to the present invention, without the roller having to touch the surfaces to be coated. Preferably each roller has a plurality of preferably a wide variety of indentations, indented edges and/or supporting surfaces, such that different profiles may be coated using the coating system according to the present invention without the rollers needing to be exchanged.

Furthermore, according to the present invention, the means of transport and/or the profiled roller have no fixed contact point, i.e. the different workpiece profiles do not always have the same contact points but rather the contact points can vary from profile to profile. This results in a high degree of flexibility for coating of the workpieces.

Preferably, the rollers are mounted on their respective axis of rotation by means of a quick release, so that they can be replaced quickly.

Preferably, the coating system according to the invention has a display and an input means. With the input means, the operator may notify the coating system of which workpiece profile will be coated next after a profile change. The display then shows the operator how be should place the workpiece upon the horizontal rollers, i.e. which contact surface on the workpiece should come into contact with which contact surface on the roller, and/or which contact surface on the workpiece should be placed upon which contact surface of the roller.

The generally horizontal rollers can be mechanically driven or designed to be merely freely rotating.

According to a further or preferred embodiment of the present invention, the transport means has a plurality of rollers each having a generally vertical axis of rotation, which are each adjustable in two directions in space, more preferably a vertical and a horizontal direction in space. These rollers serve as a lateral guide for the workpiece to be coated.

The disclosures made regarding this aspect of the present invention apply to other objects of the present invention equally and vice versa.

Due to the possibility of setting the orientation of the rollers in two spatial directions, this orientation can be optimised to the particular profile of the workpiece to be coated. Preferably, the adjustment of the rollers takes place automatically upon switching profiles. Preferably, two rollers are situated opposite to each other, to the right and to the left of the workpiece. With respect to the workpiece transport direction, preferably two rollers have staggered positioning and an axis of rotation which is vertical with respect to a profiled roller having a generally horizontal axis of rotation. Even the rollers with the generally vertical axis as of rotation are brought into a position with the workpiece to be coated such that the rollers do not contact the surfaces to be coated. Preferably, rollers with the generally vertical axis of rotation also do not have a constant cross-section, but have at least one indentation.

When configuring the rollers for a new workpiece profile, preferably multiple rollers are positioned on one side of the workpiece at the same time. Thereby only one drive motor can configure the positioning of a plurality of rollers in at least one direction in space.

At least one servomotor is preferably provided for each direction in space.

The generally vertical rollers can either be actively driven or merely freely rotating.

According to a preferred embodiment, the transport system has a top guiding surface, in particular before the coating station, which pushes the respective workpiece against the rollers having a generally horizontal axis of rotation.

Until leaving the coating station, the respective workpieces are preferably transported such that their respective ends are in contact with each other. It is particularly preferred that after leaving the coating station, the workpieces are accelerated so that they are spaced apart, i.e. isolated from each other.

At the end of the batch to be coated, a so-called "dummy" is preferably included, by which the coating system according to the present invention preferably recognises that a new profile is to be coated. This "dummy" preferably remains within the coating station. The "dummy" can be pushed out of the coating station again by the first workpiece of a new batch. Alternatively, the "dummy" can also be manually removed from the coating machine.

According to yet another embodiment or preferred embodiment of the present invention, the rollers are at least partially grounded so that no static charge accumulates on the workpieces.

According to yet another embodiment or preferred embodiment of the present invention, the transport means has a transfer lift that lifts the workpiece from the transport means and places it onto another transport means. The transfer lift in turn has a bearing jaw which has the same or at least generally the same profile as the profiled roller with the generally horizontal axis of rotation.

The disclosures made with respect to the present invention apply to the other objects of the present invention equally and vice versa.

During lifting and setting down of the workpiece, both transport means are preferably still or operate at a reduced speed.

According to yet another embodiment or preferred embodiment of the present invention, the pre-treatment station is a self-refreshing cleaning means, in particular a cleaning cloth.

The disclosures made regarding this aspect of the present invention apply to other objects of the present invention equally and vice versa.

A self-refreshing cleaning means in the sense of the present invention means that a contaminated cleaning means is automatically refreshed.

Preferably the cleaning means consists of a cleaning cloth made of paper, cloth, or similar. This cleaning cloth is preferably provided on a supply reel and it is particularly preferable that the contaminated cleaning cloth, is again rolled up onto a roller. Rolling and unrolling of the cleaning cloth can take place continuously or intermittently, and the direction of movement of the cleaning cloth is particularly preferably opposite to the transport direction of the workpiece. The cleaning cloth is preferably pressed against the workpiece to be coated, in particular against the specific surfaces of the workpiece which are to be coated. Impurities are removed from the workpiece by the relative movement between the cleaning cloth and the workpiece.

Preferably, a pre-cleaning is provided upstream from the cleaning step, in which loosely adhering dirt is removed and/or the surface of the workpiece which is to be coated is roughened. For example, this pre-cleaning is done using brushes, especially very fine non-ferrous or more preferably bronze brushes.

Downstream from the preliminary cleaning is preferably a deionisation of the workpiece. Subsequently, or alternatively, a cleaning agent is used, preferably using liquid or gas, such as nozzles and atomising spray nozzles in particular. This cleaning agent is then preferably cleaned from the workpiece using the cleaning cloth. After wiping, residual cleaning agent is removed, preferably using filtered air. The pre-treatment station is preferably located in a space under vacuum so that the resulting vapours from the cleaning agent can be absorbed.

Alternatively or additionally, the workpiece can be flame treated, for example with a gas flame or plasma jet.

According to yet another embodiment or preferred embodiment of the present invention, the coating station of the coating system consists of two units, each having two coating chambers and a transport means and which are displaceable in a direction crossways to the transport direction of the workpiece.

The disclosures made regarding this aspect of the present invention apply to other aspects of the present invention equally and vice versa.

Based on the transport direction of the workpieces, the two units are arranged one behind the other.

Preferably, each coating chamber has an ingress and an egress die, each adapted to the cross section of the workpiece to be coated.

Since the coating station is comprised of two units, each with two coating chambers, it is possible to rapidly reconfigure the system for a new profile and/or for a new coating medium because of the four coating chambers, only one is in use at any given time for coating the respective workpiece. The transport means for the unit whose coating chamber is not in use can be used to further transport the workpiece.

In a preferred embodiment, there are two coating chambers on the right side and two on the left side of the transport means, and the two coating chambers are each connected on one side to the coating agent. According to yet another embodiment or preferred embodiment of the present invention, there is a pressure chamber over the transport means, downstream from the pre-treatment station and/or the coating station. This pressure chamber ensures that no dust-laden air comes in contact with the cleaned and/or coated workpiece. Preferably the pressure is generated using purified, in particular filtered, air.

In the following, the invention will be explained with reference to FIGS. 1-10. These explanations are merely illustrative and do not limit the general inventive concept. The explanations apply equally to all objects of the present invention.

Figure 1:
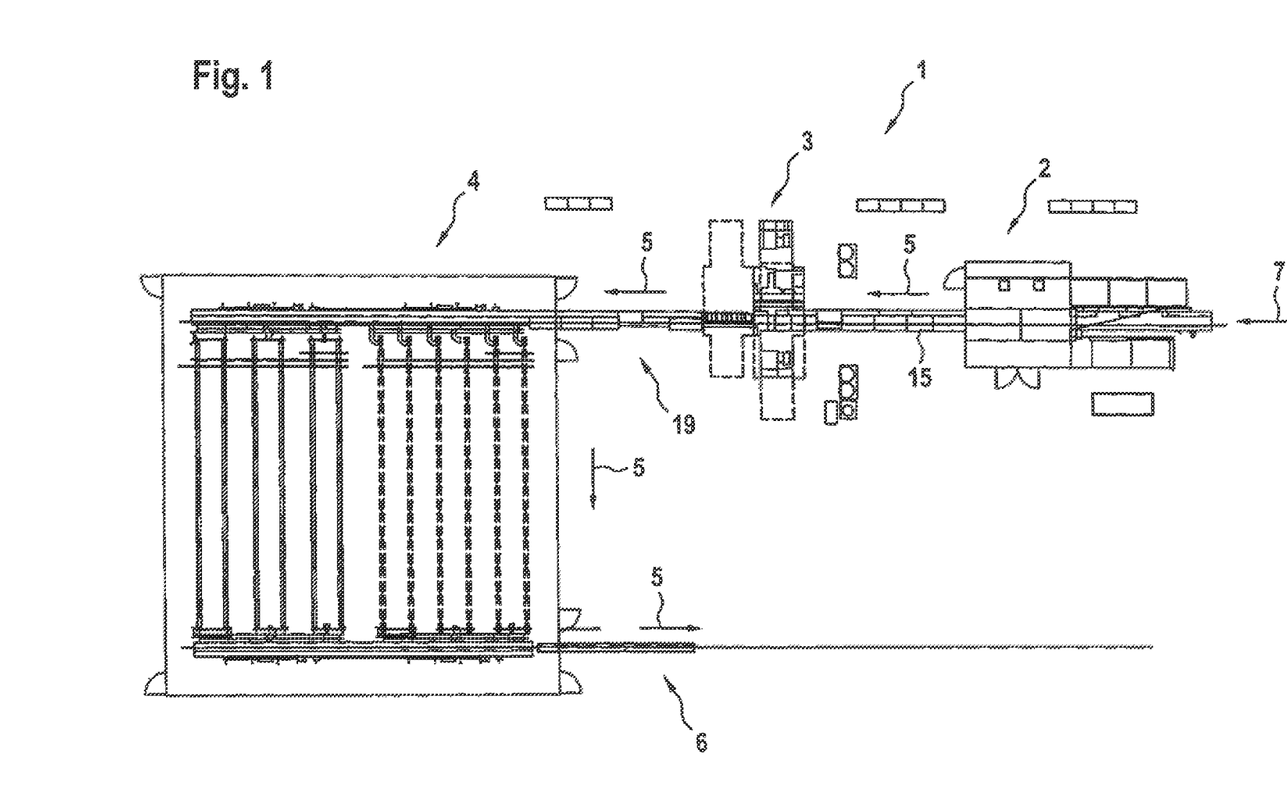
FIG. 1 shows the coating system according to the invention.

FIG. 1 shows the coating system 1 according to the invention, which has in the present case a pre-treatment station 2, a coating station 3, and a drying station 4. The workpieces to be ea coated are placed in the ingress 7 on a transport means 15 and then transported using these transport means 15 to the pre-treatment station. Here the workpiece and particularly its surfaces needing cleaning are cleaned, in particular the surfaces which are to be coated. Preferably, cleaning includes a pre-cleaning, in which loose dirt is removed using brushes, for example, in particular using fine non-ferrous metal or bronze brushes, and the surface of the workpiece is slightly roughened if desired. This is followed by a deionisation of the workpieces using an appropriate device and then, for example, a chemical pre-treatment oldie workpiece with a liquid or gaseous substance that is applied for example by fine spraying onto the workpiece and then removed again with a cleaning cloth.

Alternatively or additionally, in the pre-treatment station, a flame treatment of the workpiece can occur, for example by means of a gas flame or plasma jet, for example to activate the surface of the workpiece.

Subsequently, the workpiece is transported in the direction shown by the arrow 5 into the coating station. Preferably, the region between the pre-treatment station 2 and the coating station 3 has a housing, in particular a pressurised housing, in order to prevent soiling of the workpieces which have just been cleaned. Up until the egress of the coating station 3, the workpieces are transported such that their ends touch each other. The coating station 3 has at least a coating chamber through which the workpiece is transported and coated. Coating can be carried out on the outer portions of the workpiece and/or the inner surfaces, and the colours may be different in each case. Moreover, for example, the outer portions can be coated with different colours. The coating chamber preferably has an ingress and an egress die, whose cross section is adapted to the cross section of the workpiece to be coated so that only a small gap is present between the die and the workpiece. There is preferably a slight negative pressure inside the chamber. In the region of the ingress die, a plurality of coating nozzles are arranged that apply the coating medium onto the workpiece. Within the coating chamber, particularly in the area of the egress die, excess coating material is again sucked off of the workplace in particular that which is drawn into the false air in the gap between the die and the workpiece. After application of the finish, the workpieces are conducted primarily through an acceleration section, in particular an accelerating roller track, thereby producing a gap between the workpieces. This gap is in particular required for this in order to transfer the sections from the transport means 15 into the drying station 4. In the dryer of the drying station the workpieces are transported continuously or intermittently as shown by the arrow 5. The running direction of the transport means is here at a right angle to the transport direction in the coating station. Therefore, the dryer has a means of transport, which is single track or multi-track, in this case two-track, meaning that two workpieces are transported in parallel through the dryer. Controlled by a light barrier, transport of each workpiece is stopped before one or the other track and then the workpiece is lifted out of the transport means 15 and placed upon the transport means of the drying apparatus. Lifting of the respective workpiece can be accomplished by means of a lifting link, as shown for example in FIG. 8, or by means of a transfer conveyor. The transport means in the dryer consists of a plurality of conveyors which are arranged one after another in an endless conveyor chain and are thereby moved at a uniform rate. Preferably there are a plurality of these workpiece conveyors/transport chains/transport means parallel to each other. After insertion of a new workpiece at the ingress of the dryer on one or more workpiece conveyors, this moves through the dryer up to the lift-off position at the egress. There, using a similar or identical lifting apparatus, the workpiece is lifted from the workpiece conveyor and placed on an outfeed roller conveyor, by which means it is transported to the egress 6. Preferably, the insertion of an undried workpiece is not simultaneous with the lifting of dried workpiece, but rather these two positions are preferably reached separately, i.e. after placing of an undried workpiece at the ingress of the dryer and a dried workpiece is lifted from the egress of the dryer, etc. Preferably, the transport means is still upon lifting or laying down of the workpieces. Thereby, the workpiece carriers are always at the exact place where the workpieces are lifted out or set down, meaning that elongation from wear and tear or due to fluctuations in the temperature of the chain plays no role for the positioning of the workpiece conveyor. Optionally, however, it is also possible that the workpiece carrier moves lengthwise according to the longitudinal movement of the transfer lifter, thereby maintaining the position of the workpiece on the transfer lift relative to the workpiece carrier. Feed-out of the workpieces after drying can be done by profiled transport rollers or unprofiled straight transport systems. After drying, in a preferred embodiment, the respective workpiece can still be coated with a protective film and can then be stored for example on a pallet. With the system according to the present invention, workpieces with profiles of any type can be coated. Preferably these workpieces are made of plastic, particularly PVC or metal, and especially aluminium. Particularly, workpieces which are part of the construction of window or door frames are coated using the system.

Figure 2:
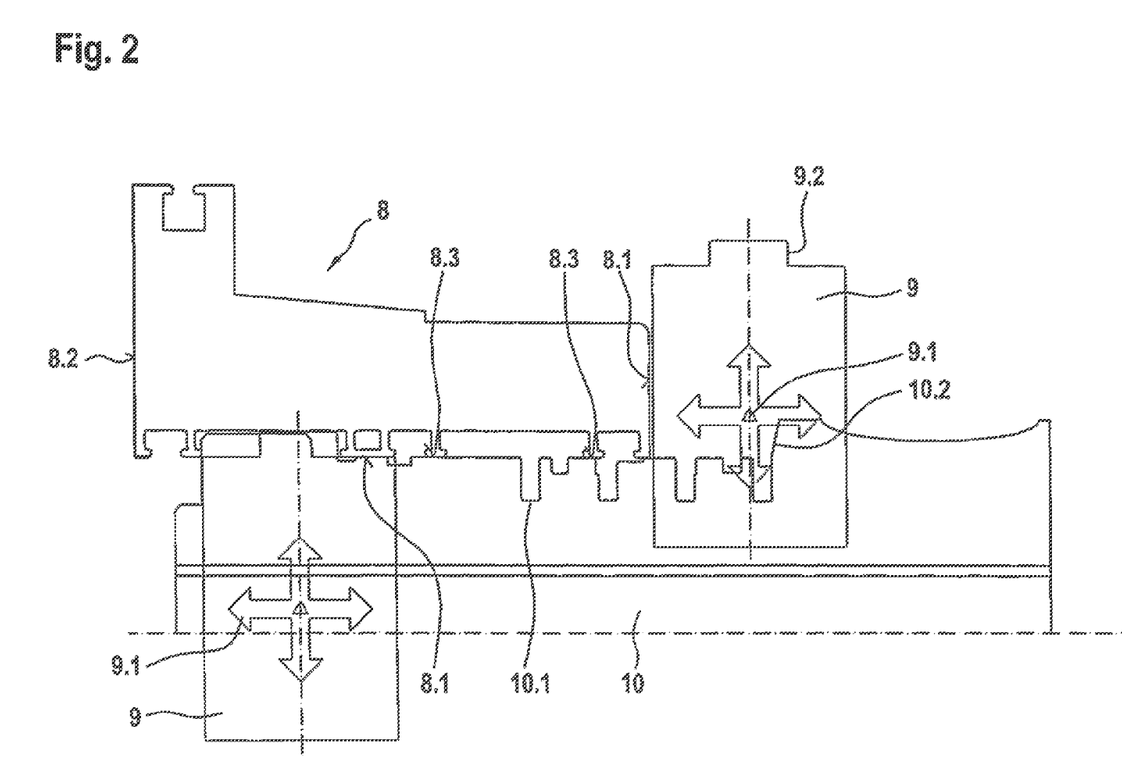
FIG. 2 shows the guiding means of the coating system.
Figure 3:
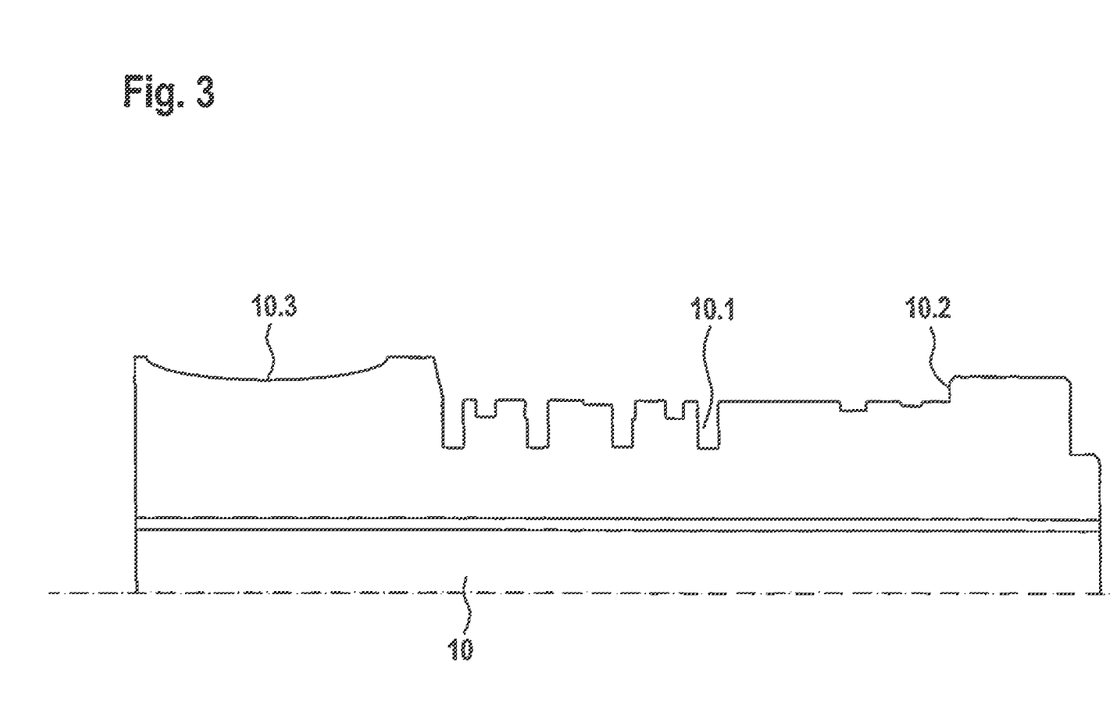
FIG. 3 shows the profile of the transport means.

FIGS. 2 and 3 show details of the transport means 15, upon which a workpiece to be coated is shown. This profile 8 is to be coated on the coating surface 8.2. In order to transport the profile in an exact position, the transport means comprises a profiled roller 10 which is rotatable about a horizontal axis. This profiled transport roller has at least one, here a plurality of indentations 10.1 and at least one indented edge 10.2 and/or at least one bearing surface 10.3. Each vertical guide roller 9, as shown by the double arrows 9.1, is adjustable in two perpendicular spatial directions, which are preferably arranged in a plane. Alternatively, at least one guide roller is also designed to be adjustable in one direction only. This allows the workpiece 8 to be guided laterally without the rollers 9 touching the surface to be coated 8.2. Furthermore, it can be seen that the rollers 9 also preferably have an indented edge 9.2, which, in turn, increases the flexibility of their use for lateral guidance of the workpiece 8. Those skilled in the art will recognise by providing a plurality of indentations or at least one indented edge and at least one, and preferably a plurality of contact surfaces, it is possible to coat a variety of different profiles, without having to change out the roller 10 or rollers 9. Adjustment of the rollers 9 to the respective workpiece profile preferably occurs automatically, after a worker of the plant has communicated which type of profile will be coated next. Particularly preferably, the plant has a display that indicates how the workpiece should be laid upon the roller 10.

Figure 4:
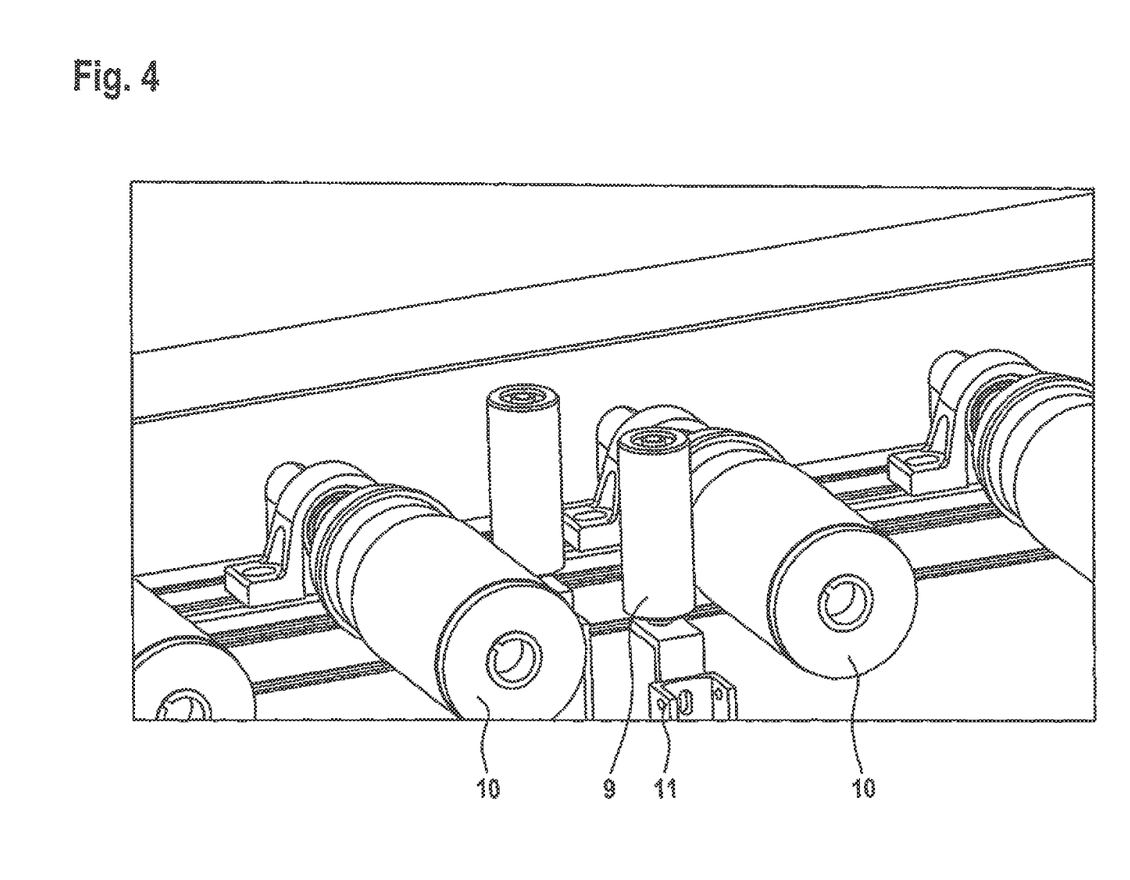
FIG. 4 shows further details of the guiding means, in particular, the vertically oriented guide rollers between the actual transport rollers.

FIG. 4 again shows the spatial arrangement of the horizontal profiled rollers 10 and the rollers 9 which turn about a vertical axis of rotation. Between two rollers 10, in turn two more rollers 9 are preferably arranged, which are located to the right and left of the workpiece and which most preferably are not mutually opposite to one another relative to the direction of motion of the workpiece, but which are preferably offset from each other. Both rollers 9 are respectively connected to a drive 11 for the adjustment of their position, as has been explained with reference to FIGS. 2 and 3.

Figure 5:
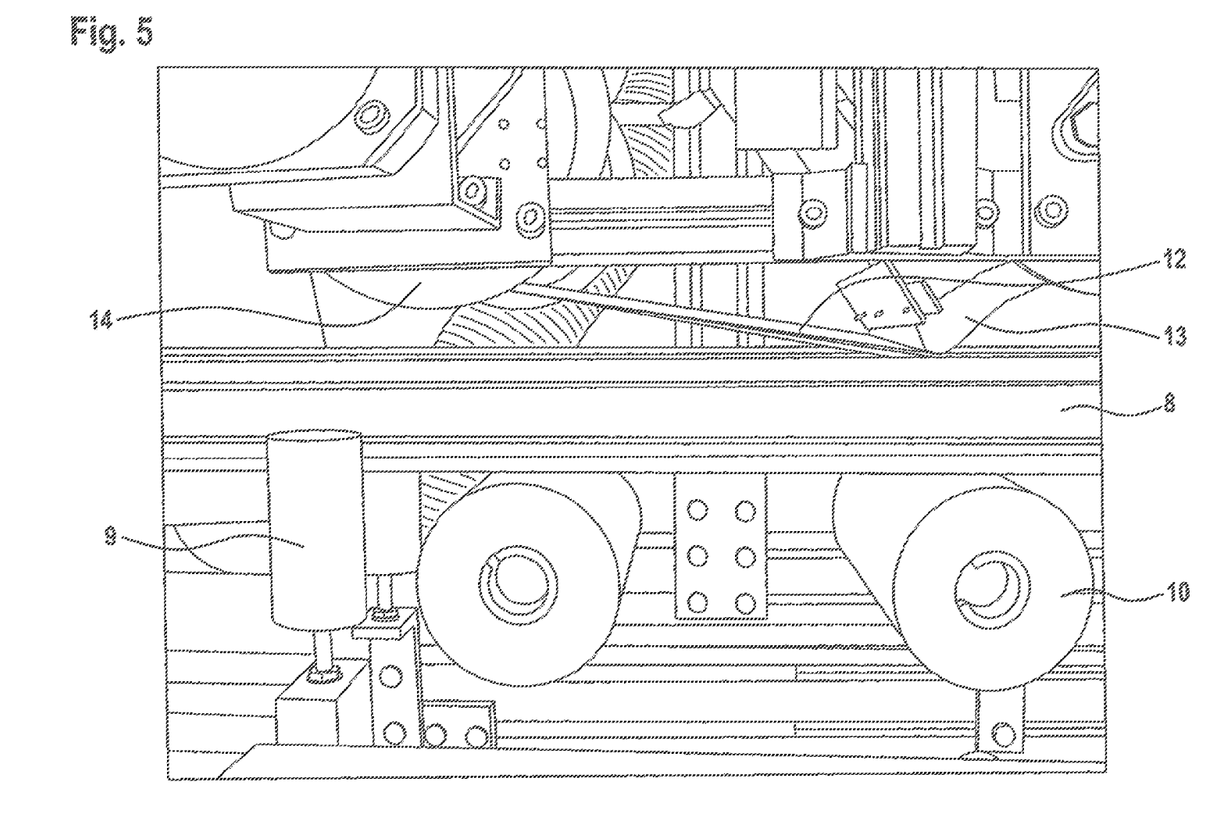
FIG. 5 shows cleaning of the workpiece with a cloth.

FIG. 5 shows part of the pre-treatment station 2 of the coating system according to the present invention. In the present case the removal of dissolved contaminants and/or applied solvent by means of a cleaning cloth 12, which is pressed in the present case by a preferably flexible pressuring means 13 to the surface to be cleaned. The workpiece to be coated moves relative to the cleaning means, here left to right. In the present case, the cleaning agent is a cleaning cloth which is unwound continuously or intermittently from a supply roller (right roller) and at the same time the contaminated cleaning cloth from a supply roll 14 is rolled up again. The direction of movement of the cleaning cloth is preferably opposite to the moving in direction of the profile to be coated. The process of unrolling and rolling up can be continuous or intermittent. Since continuous or semi-continuous new unused cleaning cloth is made available, cleaning of the workpieces to be coated is of consistent quality.

Figure 6:
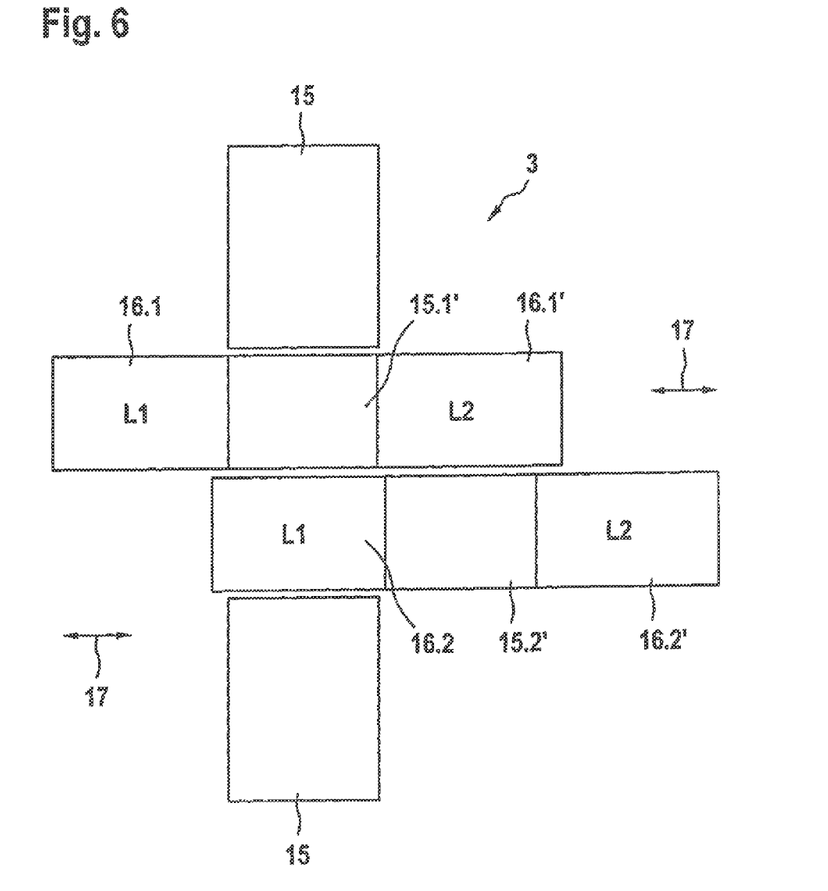
FIG. 6 shows details of the coating station for quick colour or profile change.

FIG. 6 shows details of the coating station 3. This consists in the present case of two units, a first unit 16.1, 15.1', 16.1' and a second unit 16.2, 15.2', 16.2, respectively, which, as shown by the double arrow 17, are displaceable perpendicular to the transport direction of the transport means 15. Each unit consists of two coating chambers 16.1, 16.1' and 16.2, 16.2', between each of which there is a transport means 15.1', 15.2'. In the illustrated case, the transport means 15.1' is aligned with the transport means 15. Furthermore, the coating as chamber 16.2 is aligned with the transport means 15, i.e., in this example this coating chamber 16.2 is coating the workpiece. In the coating chambers 16.1, 16.2 the workpiece is coated with the same paint L1, wherein the ingress or egress dies of both coating chambers 16.1 and 16.2 may differ from each other. The same applies to the coating chambers 16.1', 16.2', wherein said coating chambers coat the workpiece with the paint L2. In the example shown, the profile is coated with the finish L1 and the workpiece to be coated has a profile matching the profile of the dies in chamber 16.2. In the event that the colours remain, but a workpiece with a different profile should be coated, the lower unit can be shifted to the left so that the transporting means 15.2' is aligned with the transport means 15. The upper unit is shifted to the right so that the coating chamber 16.1 is aligned with the transport means 15. If the workpieces are to be coated with the paint L2, one of the chambers 16.1' or 16.2' must be in alignment with the conveying means 15. By this configuration, the downtime of the coating system for a workpiece and/or coating agent is reduced to a minimum. The person skilled in the art understands that the two units can also be provided with only one coating chamber. In this case, at least one quick change of the coating means or of the workpiece profile is provided.

Furthermore, it is understood by the skilled person that it is also possible to use only one of the two double units in order to perform a corresponding quick change.

Figure 7:
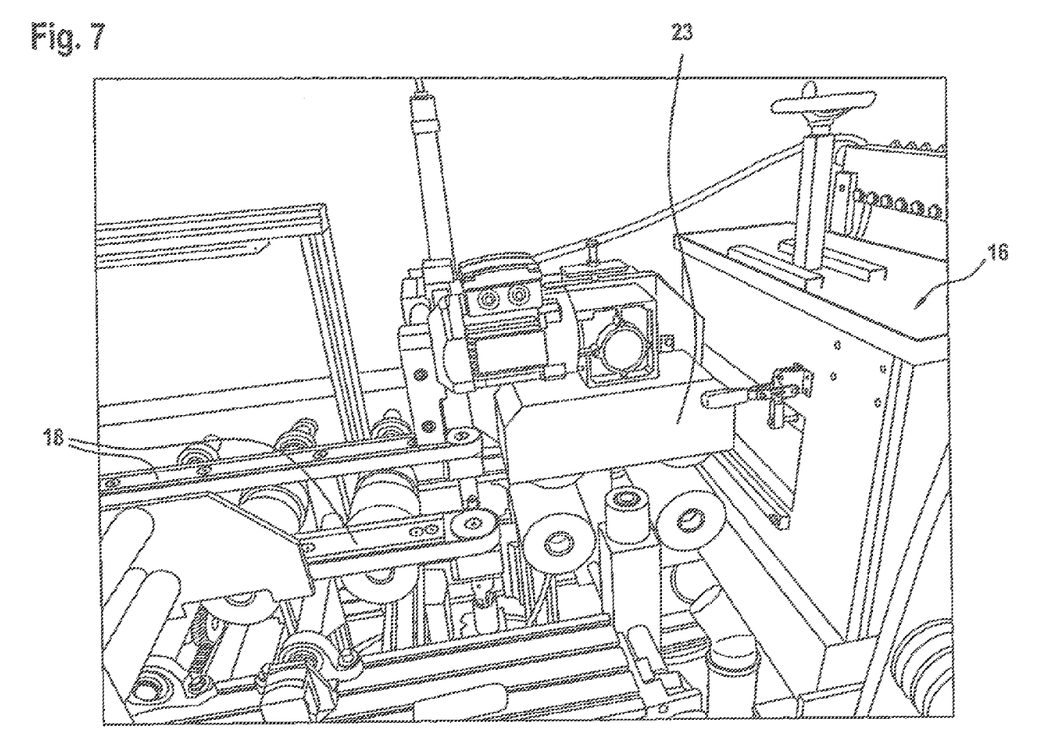
FIG. 7 shows the ingress region of the coating station.

FIG. 7 shows the area immediately upstream of the coating chamber. Clearly visible are the two separately height- and/or width-adjustable driven side gauges and the three-way adjustable (height+width+rotation) driven top holding system that has a dual role, which meshes with the top of the workpiece. Furthermore, it can be seen that between the two top pressure rollers on the right and on the left side there is a side guiding roller.

Figure 8:
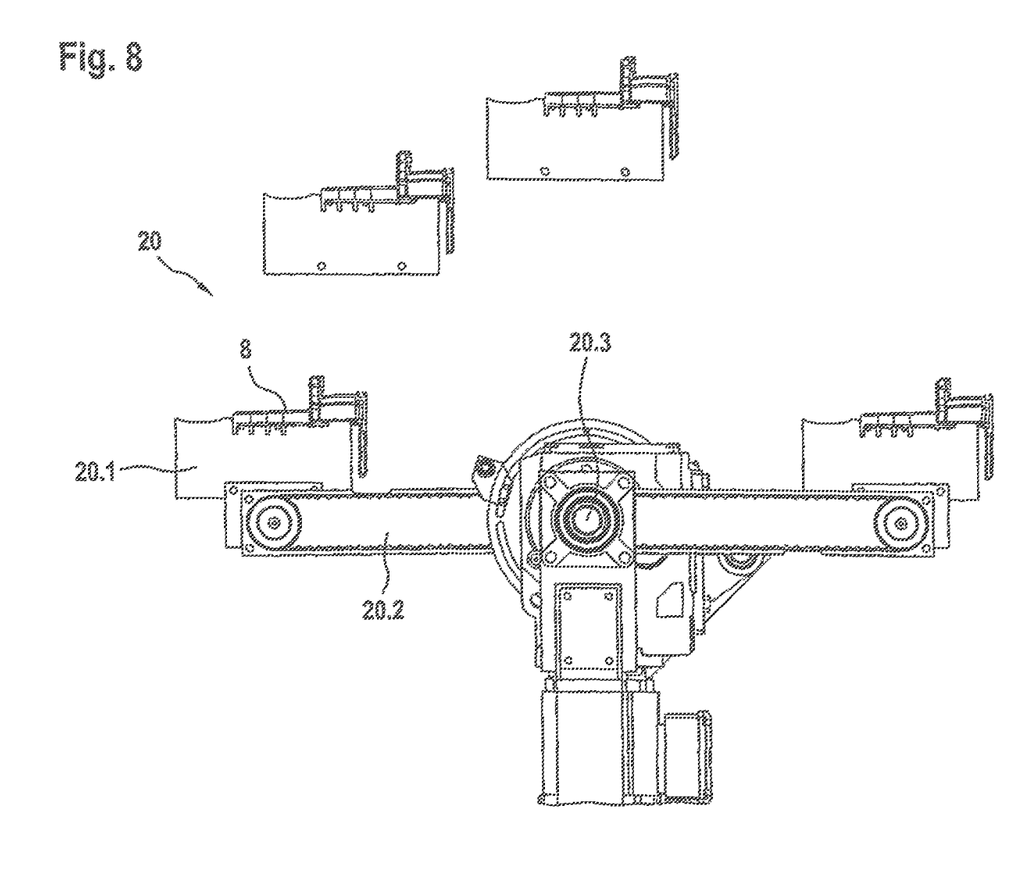
FIG. 8 shows the transfer lift.

FIG. 8 shows the transfer lift 20 which in the present embodiment has a crank arm with a lever 202 and a bearing pad 20.1. You can see the lever 202 in the lift-off position (left position) and in the transfer position (right position) and two intermediate positions. The rotational axis of the lifter is parallel to the transport direction 5. The hearing pad 20.1 preferably has the same, or at least a similar profile to that of the profiled roller 10, so that they accept the workpiece 8 in a defined position and move the workpiece from the transport system 15 to the transport system of the dryer by means of a rotation, here clockwise.

Figure 9:
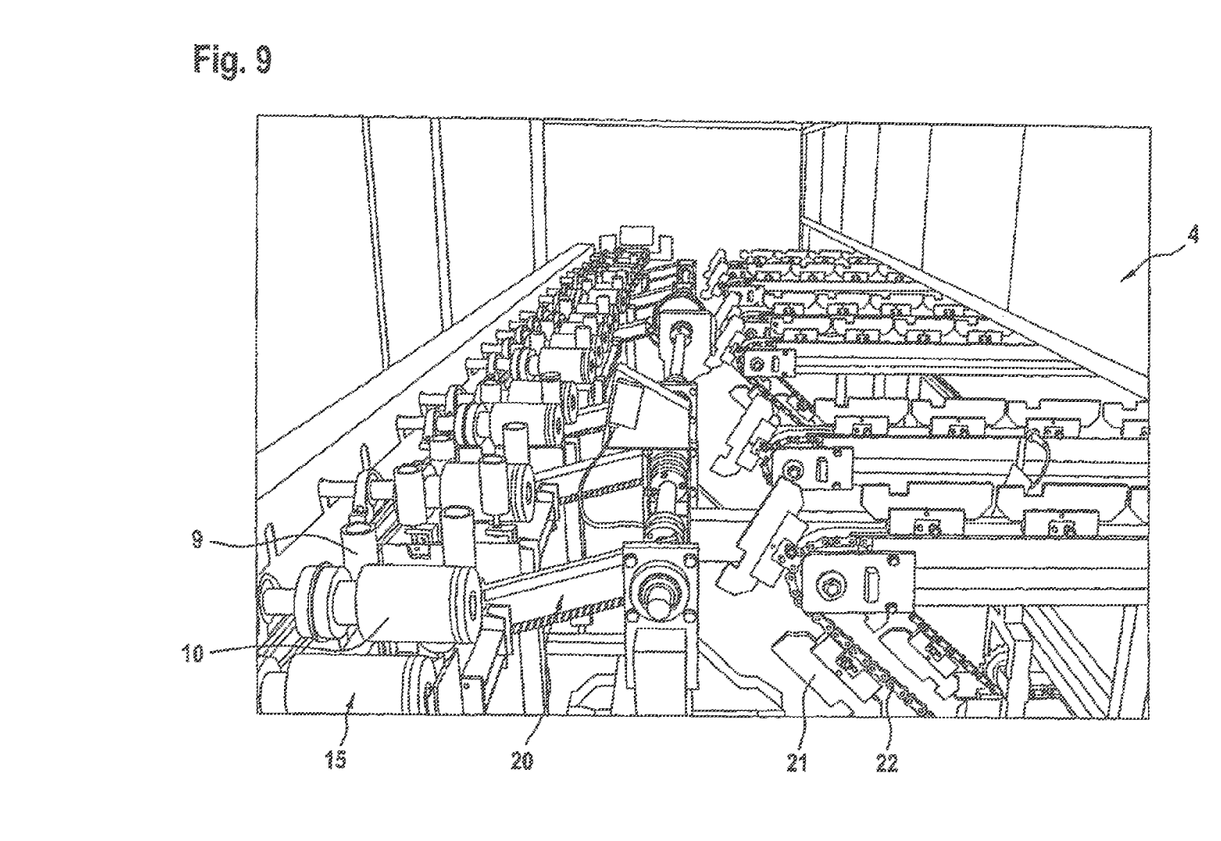
FIG. 9 shows the transfer area between the guiding means and the drying station.
Figure 10:
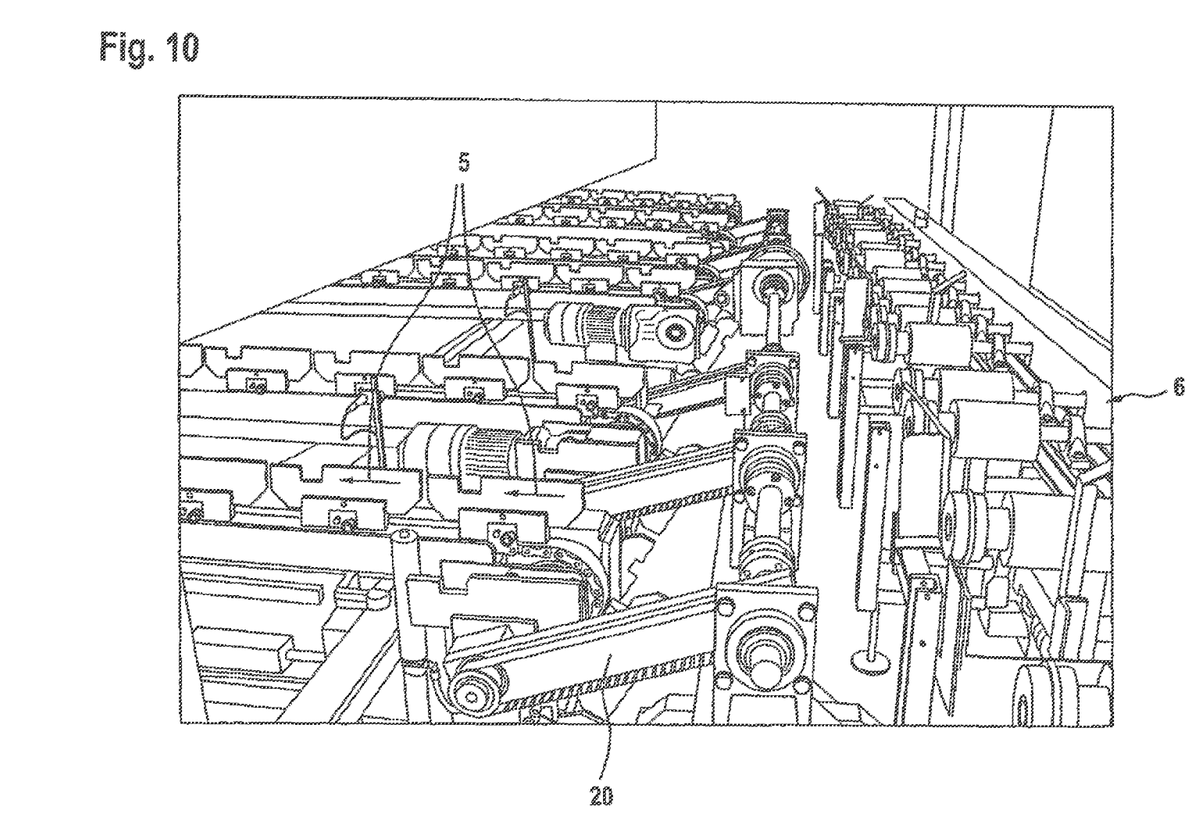
FIG. 10 shows the exit region of the drying station.

FIG. 9 shows the ingress of the dryer. The transport system 15 with its horizontal rollers 10 and its vertical rollers 9 can be seen on the left. On the far right, the ingress area of the drying station 4 with its transport means can be seen, consisting of a plurality of continuous chains 22 on which a workpiece carrier 21 is provided. In the present case, the drying station is equipped with two parallel transport systems so that transport between the transport means 15 and the ingress region of the drying station, two parallel independently operating transfer lifters 20 are provided. After insertion of a new workpiece at the ingress (insert position) the transport chain moves through the dryer in the lift-off at the exit point. There, through a similar or identical lifting apparatus 20, the workpiece is lifted out of the workpiece carriers and laid onto are outfeed rolling conveyor (see FIG. 10). After this the transport chain continues with the next workpiece carrier to the unloading position. It is hereby advantageous that the loading and unloading positions are not in the same stop position. In this manner, it is possible to compensate for the elongation of the transport chain, without changes to the position of the workpiece carrier requiring a loading and an unloading position.

LIST OF REFERENCE NUMERALS

1 Coating system
2 Pre-treatment station
3 Coating station
4 Drying station
5 The transport direction of the workpiece
6 Egress
7 Ingress
8 Plastic and/or metal workpiece
8.1 Bearing surface
8.2 Coating surface
8.3 Bearing surface
9 Roller with vertical axis
9.1 Orientation
10 Roller with horizontal axis of rotation
10.1 Indentation
10.2 Paragraph
10.3 Bearing surface
11 Drive for movement of roller 9
12 Cleaning agent, cleaning cloth
13 Pressing means
14 Supply roller
15 Transport means
15' Mobile transport means
16 Coating chamber
16.1 First coating chamber for the first coating medium
16.1' First coating chamber for the second coating medium
16.2 Second coating chamber for the first coating medium
16.2' Second coating chamber for the second coating medium
17 Direction of motion
18 Guides, page ruler
19 Pressurisation
20 Transfer lifter
20.1 Bearing pad
20.2 Lever
20.3 Axis of rotation
21 Profile carrier, carriage
22 Drive means, chain
23 Top pressure system
L1 First coating medium
L2 Second coating medium

The invention claimed is:

1. A coating system for coating an elongated plastic and/or metal workpiece with a finish, with a pre-treatment station, a coating station and a drying station, wherein a transport means transports the workpiece along the coating system, wherein the transport means comprises one or more profiled rollers with an essentially horizontal axis of rotation, the one or more profiled rollers each having a plurality of a wide variety of indentations and at least one recess and/or a supporting surface, and wherein the coating system comprises a transfer lifter that lifts the workpiece from the transport means and places it on another conveying means, whereby the transfer lifter includes a bearing pad that has at least substantially the same profile as a least one of the one or more profiles rollers.

2. The coating system according to claim 1, wherein the transport means comprises a plurality of vertical rollers with a vertical axis of rotation, which are adjustable at least in one spatial direction.

3. The coating system according to claim 2, wherein the plurality of vertical rollers are adjustable in two spatial directions.

4. The coating system according to claim 1, wherein the one or more profiled rollers are at least partially grounded.

5. The coating system according to claim 1, wherein the pre-treatment station comprises a self-refreshing cleaning means.

6. The coating system according to claim 5, wherein the cleaning means moves against a direction of travel of the workpiece.

7. The coating system according to claim 5, wherein the cleaning means comprises a cleaning cloth.

8. The coating system according to claim 1, wherein the coating station comprises a unit having two coating chambers and the transport means and which moves crosswise with respect to a direction of transport of the workpiece.

9. The coating system according to claim 1, wherein the coating station comprises two units, each having two coating chambers, and the transport means and which each may move crosswise with respect to a direction of transport of the workpiece.

10. The coating system according to claim 9, wherein the two coating chambers are provided to the right and left of the transport means and which in each case are connected to a same coating medium.

11. The coating system according to claim 1, wherein downstream of the pre-treatment station and/or of the coating station, a pressure chamber over the transport means is provided along a direction of transport of the transport means.

* * * * *